(12) United States Patent
Dufrene et al.

(10) Patent No.: US 8,075,785 B2
(45) Date of Patent: Dec. 13, 2011

(54) SEPARATION VESSEL FOR SOLIDS REMOVAL

(75) Inventors: Andy Dufrene, Houma, LA (US); Joey Jacob, Arnaudville, LA (US); Vincent Spekschate, Eunice, LA (US); Eddie Boudreaux, Maurice, LA (US); Brian Fontenot, Church Point, LA (US)

(73) Assignee: Omni Energy Services Corp., Lafayette, LA (US)

( * ) Notice: Subject to any disclaimer, the term of this patent is extended or adjusted under 35 U.S.C. 154(b) by 342 days.

(21) Appl. No.: 12/470,936

(22) Filed: May 22, 2009

(65) Prior Publication Data

US 2010/0294317 A1 Nov. 25, 2010

(51) Int. Cl.
*B01D 21/18* (2006.01)
*B65G 33/10* (2006.01)
*B65G 33/24* (2006.01)

(52) U.S. Cl. ........ 210/744; 210/803; 210/104; 210/523; 210/532.1; 210/540; 198/657; 198/666; 198/671; 198/672

(58) Field of Classification Search ............... 210/744, 210/803, 104, 143, 523, 524, 532.1, 538, 210/539, 540; 198/657, 666, 671, 672
See application file for complete search history.

(56) References Cited

U.S. PATENT DOCUMENTS

| | | | | |
|---|---|---|---|---|
| 1,732,386 A * | 10/1929 | Sprockhoff | ............... | 210/523 |
| 2,107,625 A * | 2/1938 | Bettis | ............... | 210/523 |
| 3,623,608 A * | 11/1971 | Waterman | ............... | 210/539 |
| 3,820,860 A * | 6/1974 | Stone | ............... | 198/672 |
| 4,132,645 A * | 1/1979 | Bottomley et al. | ............... | 210/540 |
| 4,175,039 A | 11/1979 | Fisher | | |
| 4,220,242 A * | 9/1980 | Forsberg | ............... | 198/666 |
| 4,257,895 A * | 3/1981 | Murdock | ............... | 210/532.1 |
| 4,636,308 A * | 1/1987 | Summers | ............... | 210/523 |
| 4,673,500 A | 6/1987 | Hoofnagle et al. | | |
| 4,783,272 A | 11/1988 | Patterson | | |
| 5,204,000 A * | 4/1993 | Steadman et al. | ............... | 210/538 |
| 5,876,512 A | 3/1999 | Desormeaux et al. | | |
| 6,021,787 A | 2/2000 | Luke | | |
| 6,736,970 B1 * | 5/2004 | Kivisto et al. | ............... | 210/524 |
| 7,160,474 B2 * | 1/2007 | Harding | ............... | 210/523 |
| 7,210,488 B2 | 5/2007 | Desormeaux | | |
| 7,247,243 B2 | 7/2007 | Eriksson | | |
| 7,438,808 B2 * | 10/2008 | Grimmel | ............... | 210/523 |
| 2005/0173337 A1 * | 8/2005 | Costinel | ............... | 210/540 |

* cited by examiner

*Primary Examiner* — Christopher Upton
(74) *Attorney, Agent, or Firm* — Warner J. Delaune; Baker Donelson, et al.

(57) ABSTRACT

A separation device for removing solids from an input stream is provided, comprising a vessel, such as a production vessel or storage tank, having an inlet for receiving an input stream containing fluids, such as oil and water, and solids, such as sand and silt. The vessel also includes a fluid outlet and a drain outlet. An optional fluid recirculation and injection device is mounted inside the vessel and delivers fluid to facilitate removal of the solids through the drain outlet. The vessel also includes an agitation or flighted device mounted adjacent to the drain outlet for contacting and dislodging solids which have settled within the vessel. The agitation device includes a rotatable shaft driven by a motor, and an agitation element, such as an auger, to break up the solids and move them toward the drain outlet. A method of removing solids is also provided using the auger device.

34 Claims, 6 Drawing Sheets

SEPARATION VESSEL FOR SOLIDS REMOVAL

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

The present invention relates to devices used to separate fluids and solids, and more particularly to vessels used to remove solids from water and oil extracted from a well bore.

2. Description of Related Art

When a well has been completed in a productive formation, a mixture of reservoir fluids enters the well bore and is brought to the surface. The reservoir fluids are lifted by either internal reservoir pressure or pumps, and they contain crude oil, natural gas, produced water, and solids. The solids are generally sand and silt from the reservoir formation, and will be collectively referred to herein as "solids". The first step in the production process involves separating the oil, gas, and water into different streams where they can be managed appropriately. This is typically accomplished by gravity separation in a horizontal or vertical separation vessel.

In the typical horizontal three-phase separation vessel, gas rises to the top where it exits the vessel and can be collected for later processing and sale. Because the specific gravity of the oil is less than that of the water, the oil layer floats on top of the water layer. Using weirs or other means, the oil is collected in an internal oil container or "oil bucket", while the water is separately collected in another internal container or volume within the vessel. Both the oil and water are removed from the vessel through their respective outlets.

During the separation and removal of the oil, water, and gas, the sand is allowed to settle on the bottom of the vessel. However, the presence of solids is detrimental to the separation process, because it is highly abrasive, and its accumulation causes flow restrictions for the water and oil within the vessel. Therefore, periodic removal of the solids is required.

In existing separation vessels, solids removal requires that the inlet flow of well bore fluids be diverted from the vessel to another separation device, and all oil and water removed. This diversion of inlet fluids and cessation of separation activities is often referred to as a "shut-in" period. During the shut-in period, the vessel is opened, and a worker enters the vessel to apply pressurized water to the solids to dislodge it and discharge it from the vessel through the existing drain outlet. In most cases, portions of the solids are solidified, requiring the worker to chip away at the solids before they can be washed out of the vessel. Working conditions within the vessel are understandably poor, considering that there is little to no air flow in the presence of potentially toxic hydrocarbon fumes. Additionally, the space within the vessel is cramped, and the temperatures inside the vessel can be uncomfortably hot in the summer months. Moreover, this laborious process can take several days, resulting in additional risks to the worker, liability for the oil company and service companies, labor costs associated with the solids removal, and a loss of revenue during the shut-in period.

Given the disadvantages of the shut-in period and the difficulties of solids removal, attempts have been made to reduce the shut-in time and facilitate solids removal. One such attempt is disclosed in U.S. Pat. No. 6,021,787, and uses a nozzle inserted through an outlet on the vessel. A displacement liquid, such as water, is supplied through the nozzle while the nozzle is manipulated remotely to direct the liquid to areas of concentrated solids. Ideally, the nozzle causes the solids to be dislodged and moved toward other outlets where they can be discharged from the vessel. Similar technology described in U.S. Pat. No. 5,876,512, was also an attempt to remove solids by insertion of a lance through the outlet of the vessel. While effective to some extent, these practices have not provided sufficient removal of the solids. Additionally, because these methods are performed without shut-in, the action of the nozzle tends to cause turbulence in the water and oil, thus increasing emulsions and decreasing production efficiency.

Another effort to remove solids, described in U.S. Pat. No. 7,210,488, that has become common in the oil service industry, is to install one or more high-pressure spraying manifolds within the vessel having a number of conduits and jetting nozzles. Installation of the spraying manifolds requires a one-time shut-in, after which the spraying system can be used many times. However, each time the spraying system is operated, the inlet fluids must be temporarily diverted. The spraying manifolds are generally constructed from plastic, such as polyvinylchloride (PVC) pipe. The manifolds are supplied by one or more flexible hoses connected between the manifolds and internal fittings mounted on the manway cover on the vessel. Water supply hoses are connected to external fittings on the manway cover, and the spraying system is operated until most of the solids are dislodged and removed from the vessel.

While the spraying system, by itself, is intended to reduce the shut-in time and worker effort, the system has proven to be insufficient in many instances. Specifically, about 10% to 20% of the solids often remains in the vessel, because the solids have solidified on the bottom surfaces. Thus, even after the spraying process has been applied, workers are often required to enter the vessel and manually dislodge the solids so that they can be removed. Furthermore, although the shut-in time is substantially reduced in comparison to other methods, it is still desirable to minimize or eliminate the diversion of inlet fluids from the vessel.

Consequently, there is a need for an improved solids removal system which is more effective in dislodging solids from the internal vessel surfaces. Such a system should also enable dislodging and movement of the solids toward an outlet while the separation vessel is actively separating the oil from the water. Most importantly, the solids removal system should require no diversion of inlet fluids from the vessel, no shut-in, and no need for workers to enter the vessel to manually remove the solids.

Optionally, the improved solids removal system herein may be used in combination with the spraying system described above. If the spraying system is used in conjunction with the invention, the novelty and advantages of the invention are still realized, because no workers are required to manually dislodge the solids.

It is believed that the apparatus and method described and claimed herein directly addresses this need.

SUMMARY OF THE INVENTION

A separation device for removing solids from an input stream is provided, comprising a vessel having an inlet for receiving an input stream containing fluids and solids; a fluids outlet; and a drain outlet; an agitation device mounted adjacent to the drain outlet, the agitation device including: (a) a rotatable shaft having a first end and a second end, wherein the first end is operatively connected to a motor, and wherein the second end is supported by bearings; and (b) an agitation element attached to the shaft, wherein the agitation element is adapted to contact and dislodge the solids inside the vessel.

Optionally, an injection device is mounted inside the vessel, wherein the injection device is adapted to deliver a liquid and to facilitate removal of the solids through the drain outlet.

In a preferred embodiment, the agitation element is an auger positioned to move the solids toward the drain outlet. In a typical oilfield application, the solids will often comprise sand and silt, while the input fluids stream will contain oil and water.

In most cases, the vessel may include a first weir positioned to separate the oil from the water, as well as an oil container and a water container. In a preferred embodiment, the vessel is a horizontal pressure vessel, and the motor and bearings are mounted on expansion brackets positioned on an internal surface of the vessel.

The expansion brackets comprise a first member and a second member, wherein the first member and the second member are operatively connected to a biasing device, and wherein the biasing device biases the first member away from the second member against the internal surface of the vessel. Optionally, the biasing device includes one or more turnbuckles.

The shaft may include an intermediate bearing positioned between the first end and the second end.

The agitation device is preferably constructed from corrosion resistant materials, such as stainless steel or aluminum.

The vessel includes a manway sized to permit entry of a worker into the vessel. The manway includes a cover, wherein the cover includes a plurality of fittings adapted to receive: (a) a first set of conduits external to the vessel; and (b) a second set of conduits internal to the vessel. The first and second sets of conduits each include hydraulic control hoses for operation of the motor; and a liquid supply hose for operation of the injection device.

In addition to the separation vessel described herein, the novel features of the invention may also be provided in the form of a retrofit kit that can be used to improve the performance of existing separation vessels. For example, such retrofit kit may comprise an agitation device mountable adjacent to the drain outlet, the agitation device including: (a) a rotatable shaft having a first end and a second end, wherein the first end is operatively connected to a motor, and wherein the second end is supported by bearings; and (b) an agitation element attached to the shaft, wherein the agitation device is adapted to contact and dislodge the solids. Preferred features of the retrofit kit are either similar or identical to the features described for the separation vessel above.

A method of removing solids from a separation vessel having a drain outlet is also described, comprising providing an agitation device mounted adjacent to the drain outlet, the agitation device including: (a) a rotatable shaft having a first end and a second end, wherein the first end is operatively connected to a motor, and wherein the second end is supported by bearings; and (b) an agitation element attached to the shaft, wherein the agitation element is adapted to contact and dislodge solids inside the vessel; operating the agitation device and dislodging the solids; and operating the injection device and causing the solids to flow through the drain outlet. Preferred features of the physical components used in the method are either similar or identical to the features described for the separation vessel above.

The method may further include providing an injection device mounted within the vessel, and operating the injection device to deliver a liquid to the solids to assist removal of the solids through the drain outlet.

The method may further include detecting whether the solids within the vessel exceed a predetermined amount; and operating the agitation device to dislodge and remove the solids until the solids no longer exceed the predetermined amount.

The method may also include operating the agitation device for a duration and with a frequency in accordance with a predetermined schedule.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
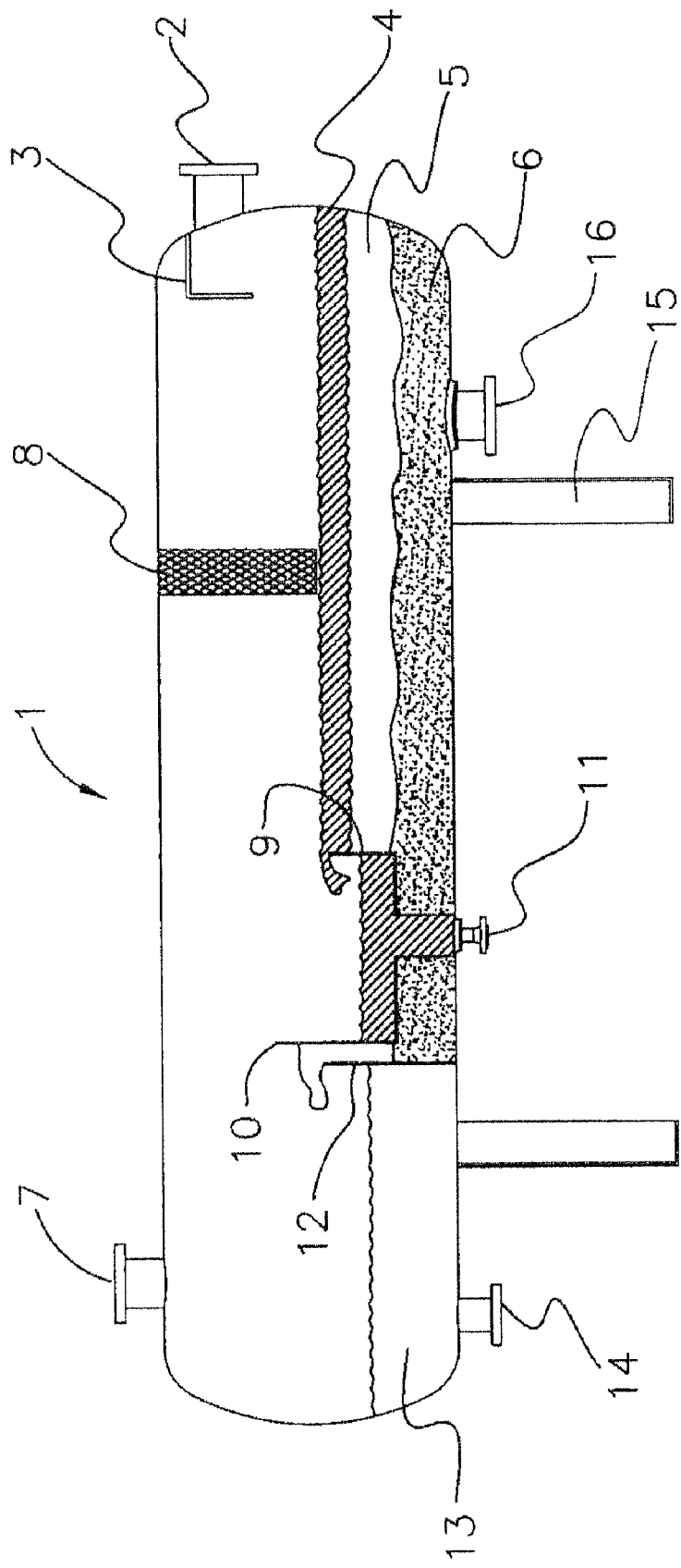
FIG. 1 shows a sectional elevation view of a prior art separation vessel used in connection with the present invention.

Turning now to FIG. 1, a prior art separation vessel 1 is shown in a sectional view. The vessel 1 includes a fluids inlet 2 for receiving fluids extracted from a well bore or other source, as well as a manway opening 20, best depicted in FIG. 2. The vessel 1 is supported by a frame 15 which rests on a firm surface near the well bore, such as the surface of an oil platform. As the fluids are received, they are deflected against a deflector plate 3 before being collected within the vessel 1. Because of the specific gravity difference between the oil 4 and water 5, the oil 4 resides above the water 5, while the solids 6 accumulate on the bottom of the vessel 1. Natural gas contained within the inlet fluids resides above the oil 4 and is extracted from the vessel 1 through gas outlet 7. A baffle plate 8 is positioned above the oil 4 and serves as a foam breaker to release gas contained within the foam. While the vessel 1 is depicted in FIG. 1 as a production separation vessel, it should be understood that the invention may be equally beneficial when used in connection with other storage tanks and similar vessels used in the oil production and refining field, because the need for solids removal is present at many points in the production process and refining process.

As the fluid level rises within the vessel 1, the oil layer 4 spills over a first weir 9 and into an oil container or "oil bucket" 10. Oil 4 is allowed to accumulate in the oil bucket 10 before being discharged from the vessel 1 through oil outlet 11. Water 5 is allowed to spill over second weir 12 and into a water container 13 or a portion of the vessel volume reserved for holding the water 5. Water 5 is allowed to accumulate in the water container 13 before being discharged from the vessel 1 through water outlet 14.

During separation and removal of the oil, water, and gas, solids 6 accumulate at the bottom of the vessel 1. If too much solids 6 are present, it will begin to obstruct the pathways for the fluids and decrease operational efficiency of the separation process. Therefore, it must be removed occasionally through the existing drain outlet 16. As explained previously, the removal of solids 6 may be accomplished by several methods and apparatuses, each having their own requirements and disadvantages. However, it is best removed by using the present invention, as described in the following preferred embodiment.

Figure 2:
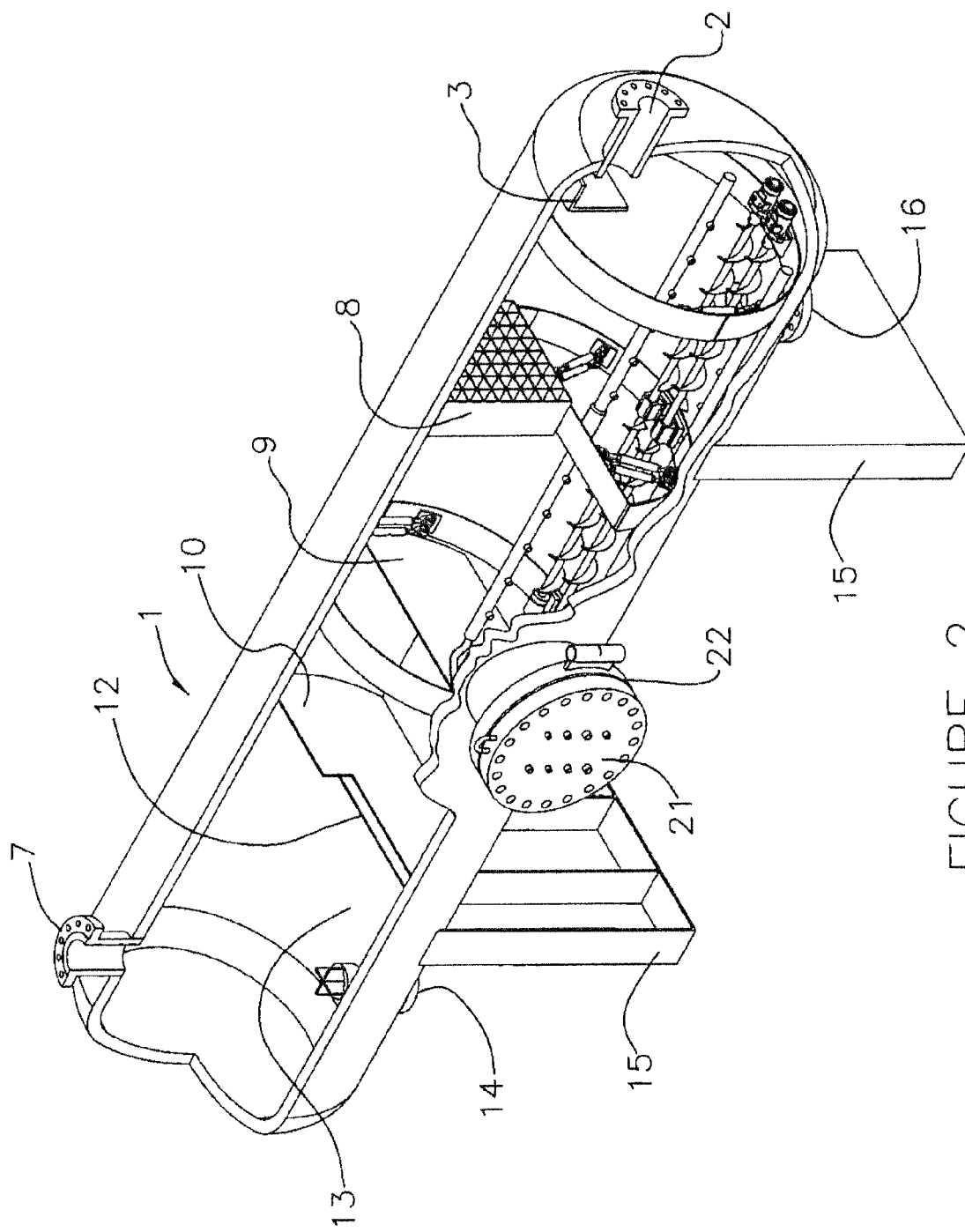
FIG. 2 shows a sectional perspective view of the embodiment of the prior art separation vessel of FIG. 1 depicting the installed agitation device.
Figure 3:
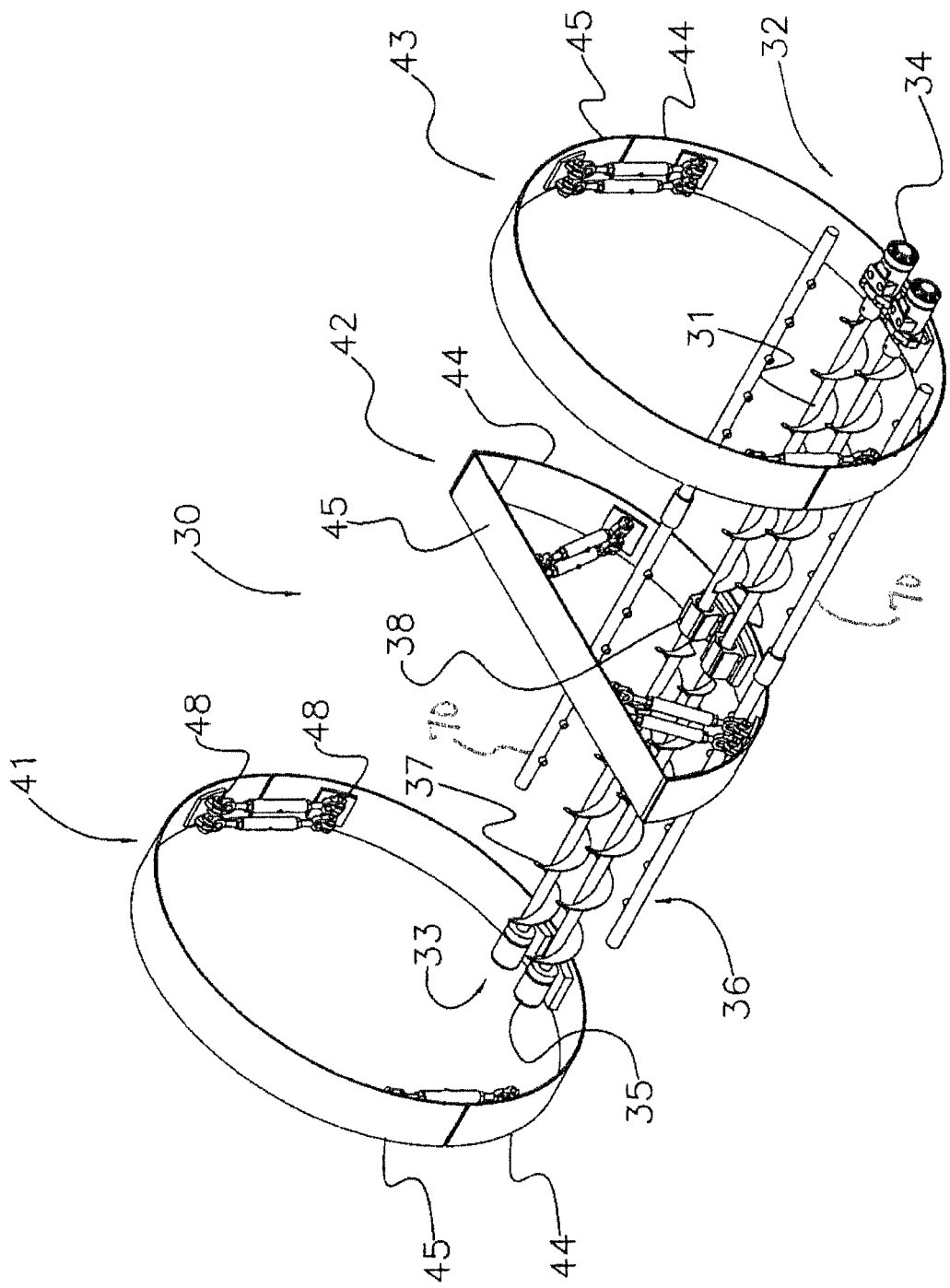
FIG. 3 shows the agitation device in an isolated perspective view.

With reference to FIG. 2, a perspective view of the vessel 1 is shown with the features of the present invention installed. The oil 4, water 5, and solids 6, are omitted from this view for clarity, so that the invention can be more readily understood. As stated above, the vessel 1 includes a manway opening 20, which can be sealably closed by a hinged manway cover 21. After a shut-in of the vessel 1, including diversion of the inlet fluids to another separation vessel, and conventional cleanout and desanding of the vessel, an agitation device 30, best depicted in FIG. 3, is mounted adjacent to the existing drain outlet 16. FIG. 3 illustrates the agitation device 30 in an isolated view for clarity, with the understanding that all components thereof are installed within the vessel 1 in the manner described below.

The agitation device 30 generally comprises at least one rotatable shaft 31 having a first end 32 and a second end 33, wherein the shaft 31 extends longitudinally along the vessel 1. The first end 32 of the shaft 31 is operatively connected to a motor 34, and the second end 33 is supported by bearings 35. The shaft 31 may include one or more intermediate bearings 38 positioned between the first end 32 and the second end 33.

The shaft 31 includes at least one agitation or flighted element 36 attached to the shaft 31, wherein the agitation element 36 is adapted to contact and dislodge the solids 6 inside the vessel 1. In a preferred embodiment, the agitation element 36 is an auger 37, in the form of a helical blade surrounding the shaft 31. As will be appreciated, rotation of the shaft 31 causes the auger 37 to rotate and dislodge materials that it contacts. The auger 37 also causes loose materials, such as solids 6, to move in the direction of the helical motion, and advantageously toward the existing drain outlet 16. Agitation elements 36 other than an auger 37 may also be used to dislodge compacted solids 6, but may not be as effective in moving the dislodged solids 6 toward the existing drain outlet 16. Preferably, at least two shaft assemblies should be employed, as shown in FIG. 3, wherein each shaft 31 is driven by its own motor 34, and supported by its own bearings 35, 38.

In an installed configuration, the motor 34 and bearings 35, 38 are securely mounted on expansion brackets 41, 42, 43 positioned on the internal surface of the vessel 1. Each of the expansion brackets 41, 42, 43, in the form of circumferential bands, includes a first member 44 and a second member 45, wherein the first member 44 and the second member 45 are operatively connected to a biasing device 46. The biasing device 46 biases the first member 44 away from the second member 45 against the internal surface of the vessel 1. In a preferred embodiment, the biasing device 46 includes one or more turnbuckles 47 which are pivotally connected on each end to brackets 48 mounted on the first member 44 and second member 45.

As shown in FIG. 3, each first member 44 of expansion brackets 41 and 43 rests on approximately half of the internal circumference of the vessel 1, while each second member 45 is in contact with the remaining half of the internal circumference of the vessel 1. Thus, when each turnbuckle 47 is turned in one direction, its length is increased, causing the brackets 48 to separate and the first member 44 and second member 45 of the expansion brackets 41 and 43 to tighten against the internal surface of the vessel 1. When each turnbuckle 47 is turned in the opposite direction, the bands 41 and 43 are loosed for de-installation. Expansion bracket 42 functions in essentially the identical fashion as with bands 41 and 43, except that the second member 45 of band 42 may be modified to fit beneath the baffle 8. Thus, when the turnbuckles 47 are lengthened, a secure fit is achieved against the internal surface of the vessel 1 and against the bottom surface of the baffle 8.

The selection of motors 34, bearings 35, 38, auger blades 37, and bands 41, 42, 43, should be made such the auger blade 37 is close to the bottom surface of the vessel 1 to ensure that as much solids 6 as possible is dislodged. However, to avoid metal to metal contact between the auger blade 37 and the vessel 1, a sufficient clearance should also be maintained. As will be appreciated, the clearance between the auger blade 37 and the vessel 1 is preferably determined based on a number of factors, including but not limited to the length of the shafts 31 unsupported by bearings and the projected amount of solids accumulating within the vessel.

Figure 4:
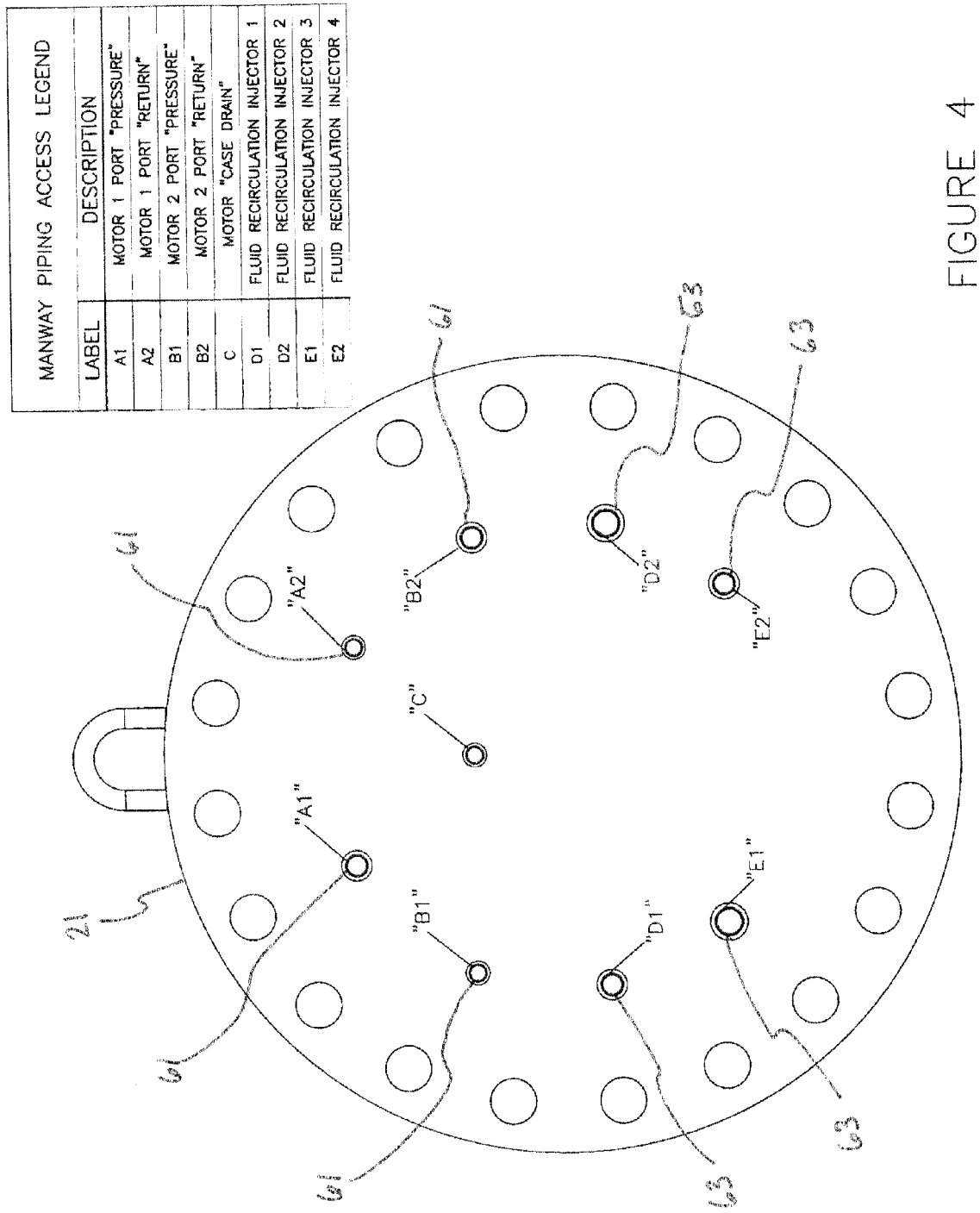
FIG. 4 shows a detailed view of the manway cover with required fittings.
Figure 5:
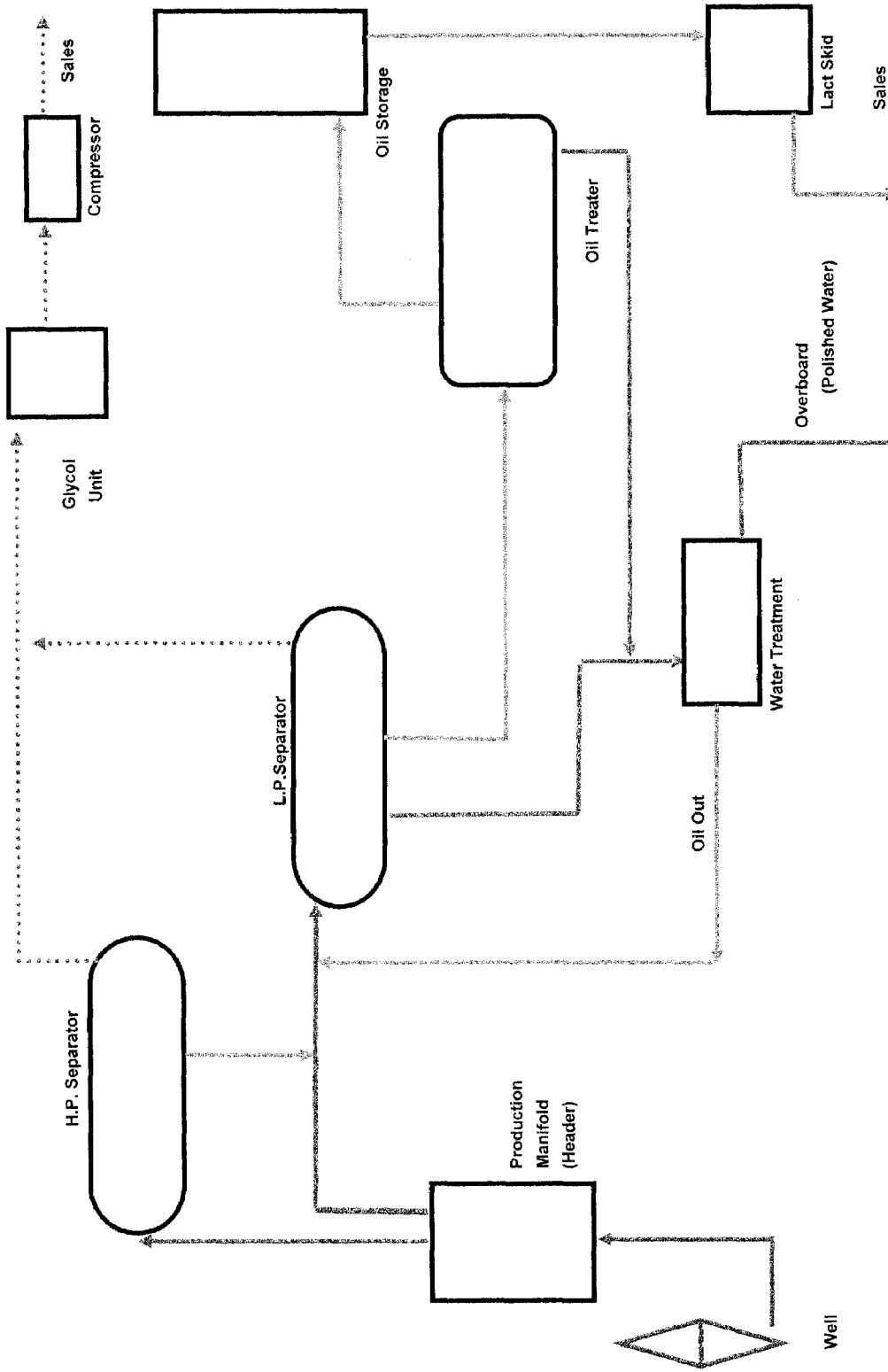
FIG. 5 shows a schematic diagram of the separation vessel and various related process components in a preferred embodiment.
Figure 6:
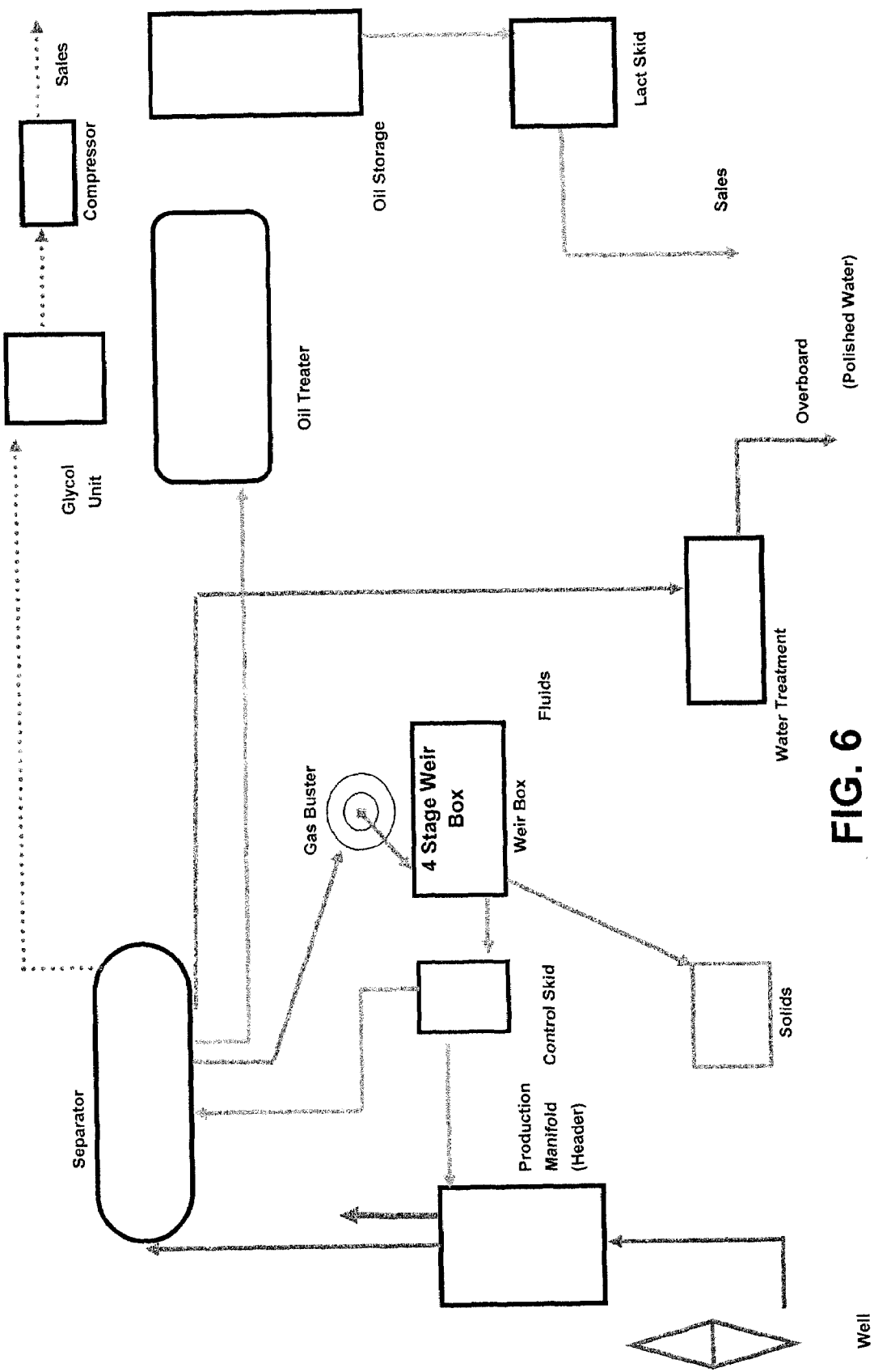
FIG. 6 shows a schematic diagram of the separation vessel and various related process components in an alternate embodiment.

Because of the need to eliminate sparking and the possibility of explosion within the hydrocarbon environment, the motors 34 are preferably hydraulic motors. Thus, each motor 34 would require an input and return hydraulic hose. If two motors 34 are employed, a total of four hydraulic hoses would extend from the motors 34, and are preferably connected to hydraulic fittings 61 mounted on the manway cover 21. The hydraulic fittings 61 are adapted to receive a first set of conduits external to the vessel 1, such as those coming from a hydraulic power source 62; and a second set of conduits internal to the vessel 1, such as those connected to the motors 34. Injection fluid fittings 63 are also provided as desired to operate the injection system 70 as described below. A more detailed view of the manway cover 21 and its required fittings is illustrated in FIG. 4. The schematic diagrams of FIG. 5 and FIG. 6 show the location of the separation vessel 1 in the context of other equipment typically employed in the oil production process.

It should be understood that the bands 41, 42, 43 may comprise any shape that permits them to be installed substantially similar to the manner described above. In a more preferred embodiment, the outside facing surfaces of bands 41, 42, 43 may be coated or applied with a vulcanized rubber or other elastomeric material, which provides the benefit of a more secure friction fit against the internal surfaces of the vessel 1. Also, the agitation device 30 and all of its metal components are preferably constructed from corrosion resistant materials, such as stainless steel or aluminum.

As should be understood from the foregoing description, the invention can be embodied or supplied in the form of a complete separation vessel 1. Alternatively, the invention can be supplied as a retrofit kit capable of being installed as needed in separation vessels which are currently subject to prior art desanding methods.

When the invention is used alone with the vessel 1, the method of operation simply involves activating the agitation device 30 intermittently as needed while the separation vessel is online and operating. Thus, in the preferred embodiment, the hydraulic motors 34 would be operated in a manner that dislodges the solids 6 and moves the solids 6 toward the outlet 16. The rotational speed of the shaft 31 should be slow enough to minimize turbulence in the water 5 below the oil 4, and should preferably range from 1 to 1000 revolutions per minute (rpm). Thus, the existing drain outlet 16 may be opened to allow discharge of the solids 6 and water 5 for only as long as required to remove most of the solids 6 in the vessel 1, while the inlet fluids continue to be received through inlet 2. Infrared detection techniques may also be employed to detect the level of solids 6 in the vessel 1, and operation of the agitation device 30 may be initiated in response to detection of solids reaching or exceeding some predetermined amount. Operation of the agitation device 30 and removal of the solids 6 would continue until the solids 6 are decreased to the desired level. Alternatively, the method may also include operating the agitation device 30 for a duration and with a frequency in accordance with a predetermined schedule, such as weekly, monthly, or as required by specific customer needs.

Notably, it is also possible to operate the invention in combination with an injection device 70, similar to the apparatus described in U.S. Pat. No. 7,210,488, the disclosure of which is incorporated herein by reference. The injection device 70 is used in combination with a fluid recirculation line or manifold mounted inside the vessel 1 that recirculates water and delivers it to the solids to assist in their removal from the vessel 1. In that configuration, the normal shut-in procedures, or diversion of the inlet stream, would apply for that injection device 70. However, operation of the agitation device 30 in addition to the injection operation may enhance the dislodging and removal of the solids 6 from the vessel 1.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A separation device for removing solids from an input stream, comprising:
　a vessel having an inlet for receiving an input stream containing fluids and solids; a fluids outlet; and a drain outlet; and
　an agitation device mounted adjacent to the drain outlet, the agitation device including:
　　(a) a rotatable shaft having a first end and a second end, wherein the first end is operatively connected to a motor, and wherein the second end is supported by bearings; and
　　(b) an agitation element attached to the shaft, wherein the agitation element is adapted to contact and dislodge the solids inside the vessel;
　wherein the motor and bearings are mounted on expansion brackets positioned on an internal surface of the vessel.

2. The device of claim 1, further comprising a fluid recirculation line mounted inside the vessel, wherein an injection device is adapted to deliver a liquid to assist in the removal of the solids through the drain outlet.

3. The device of claim 1, wherein the agitation element is an auger.

4. The device of claim 3, wherein the auger is positioned to move the solids toward the drain outlet.

5. The device of claim 1, wherein the vessel includes a first weir positioned to separate produced fluids.

6. The device of claim 5, wherein the produced fluids are oil and water, and wherein the vessel includes an oil container and a water container.

7. The device of claim 1, wherein the expansion brackets comprise a first member and a second member, wherein the first member and the second member are operatively connected to a biasing device, and wherein the biasing device biases the first member away from the second member against the internal surface of the vessel.

8. The device of claim 7, wherein the biasing device includes one or more turnbuckles.

9. The device of claim 1, wherein the shaft includes an intermediate bearing positioned between the first end and the second end.

10. The device of claim 1, wherein the agitation device is constructed from corrosion resistant materials.

11. The device of claim 1, wherein the vessel includes a manway sized to permit entry of a worker into the vessel.

12. The device of claim 11, wherein the manway includes a cover, and wherein the cover includes a plurality of fittings adapted to receive:
　(a) a first set of conduits external to the vessel; and
　(b) a second set of conduits internal to the vessel.

13. The device of claim 12, wherein the first and second sets of conduits include hydraulic control hoses for operation of the motor.

14. A retrofit kit for improving the removal of solids from a vessel, wherein the vessel includes a manway and a drain outlet, comprising:
　an agitation device mountable adjacent to the drain outlet, the agitation device including:

(a) a rotatable shaft having a first end and a second end, wherein the first end is operatively connected to a motor, and wherein the second end is supported by bearings; and (b) an agitation element attached to the shaft, wherein the agitation element is adapted to contact and dislodge the solids;

wherein the motor and the bearings are mounted on expansion brackets adapted to mount on an internal surface of the vessel.

15. The retrofit kit of claim 14, wherein the agitation element is an auger.

16. The retrofit kit of claim 14, wherein the expansion brackets comprise a first member and a second member, wherein the first member and the second member are operatively connected to a biasing device, and wherein the biasing device biases the first member away from the second member against the internal surface of the vessel.

17. The retrofit kit of claim 16, wherein the biasing device includes one or more turnbuckles.

18. The retrofit kit of claim 14, wherein the shaft includes an intermediate bearing positioned between the first end and the second end.

19. The retrofit kit of claim 14, wherein the agitation device is constructed from corrosion resistant materials.

20. The retrofit kit of claim 14, further comprising a replacement manway cover, wherein the replacement manway cover includes a plurality of fittings adapted to receive:
    (a) a first set of conduits external to the vessel; and
    (b) a second set of conduits internal to the vessel.

21. The retrofit kit of claim 20, wherein the first and second sets of conduits include hydraulic control hoses for operation of the motor.

22. A method of removing solids from a vessel having a drain outlet, comprising:

providing an agitation device mounted adjacent to the drain outlet, the agitation device including:
    (a) a rotatable shaft having a first end and a second end, wherein the first end is operatively connected to a motor, and wherein the second end is supported by bearings; and
    (b) an agitation element attached to the shaft, wherein the agitation element is adapted to contact and dislodge solids inside the vessel;

wherein the motor and bearings are mounted on expansion brackets positioned on an internal surface of the vessel; and operating the agitation device to dislodge the solids and move the solids toward the drain outlet.

23. The method of claim 22, wherein the agitation element is an auger.

24. The method of claim 22, further comprising providing an injection device mounted within the vessel, and operating the injection device to deliver a liquid to the solids to assist removal of the solids through the drain outlet.

25. The method of claim 22, wherein the solids comprise sand and silt.

26. The method of claim 22, wherein the expansion brackets comprise a first member and a second member, wherein the first member and the second member are operatively connected to a biasing device, and wherein the biasing device biases the first member away from the second member against the internal surface of the vessel.

27. The method of claim 26, wherein the biasing device includes one or more turnbuckles.

28. The method of claim 22, wherein the shaft includes an intermediate bearing positioned between the first end and the second end.

29. The method of claim 22, wherein the agitation device is constructed from corrosion resistant materials.

30. The method of claim 22, wherein the vessel includes a manway sized to permit entry of a worker into the vessel.

31. The method of claim 30, wherein the manway includes a cover having a plurality of fittings adapted to receive:
    (a) a first set of conduits external to the vessel; and
    (b) a second set of conduits internal to the vessel.

32. The method of claim 31, wherein the first and second sets of conduits include hydraulic control hoses for operation of the motor.

33. The method of claim 22, further comprising:
    detecting whether the solids within the vessel exceed a predetermined amount; and
    operating the agitation device to dislodge and remove the solids until the solids no longer exceed the predetermined amount.

34. The method of claim 22, further comprising:
    operating the agitation device for a duration and with a frequency in accordance with a predetermined sequence.

* * * * *